J. TILTON.

Spring Side-Bar for Vehicles.

No. 8,415. Reissued Sept. 17, 1878.

Attest:
H. C. Perrine
J. A. Rutherford

Joseph Tilton.
Inventor.

By. James L. Norris.
Atty.

N. PETERS, PHOTO-LITHOGRAPHER, WASHINGTON, D. C.

UNITED STATES PATENT OFFICE.

JOSEPH TILTON, OF NEW YORK, N. Y.

IMPROVEMENT IN SPRING SIDE BARS FOR VEHICLES.

Specification forming part of Letters Patent No. 160,244, dated February 23, 1875; Reissue No. 8,415, dated September 17, 1878; application filed June 21, 1878.

*To all whom it may concern:*

Be it known that I, JOSEPH TILTON, of the city, county, and State of New York, have invented certain new and useful Improvements in Spring Side Bars for Vehicles, of which the following is a specification:

This invention relates to certain improvements in side bars for side-bar vehicles, and it has for its object to provide a stronger, more elastic and durable side bar than heretofore constructed.

My invention consists, first, in a side bar for vehicles, consisting of a steel spring incased in an elastic non-metallic bar, whereby I produce a side bar having the efficient action of a steel spring combined with the appearance of an ordinary side bar; second, in a side bar for vehicles, consisting of a steel spring incased in an elastic non-metallic bar projecting somewhat beyond the sides and ends of said spring, whereby the spring is entirely concealed, and provision is made at the non-metallic ends of the bar beyond the spring for fastening said bar to the bolsters or platforms of vehicles; third, in the combination, with a metallic spring and a covering of non-metallic material, of one or more plates secured to the spring and projecting through the covering, as and for the purpose hereinafter set forth.

Figure 1:
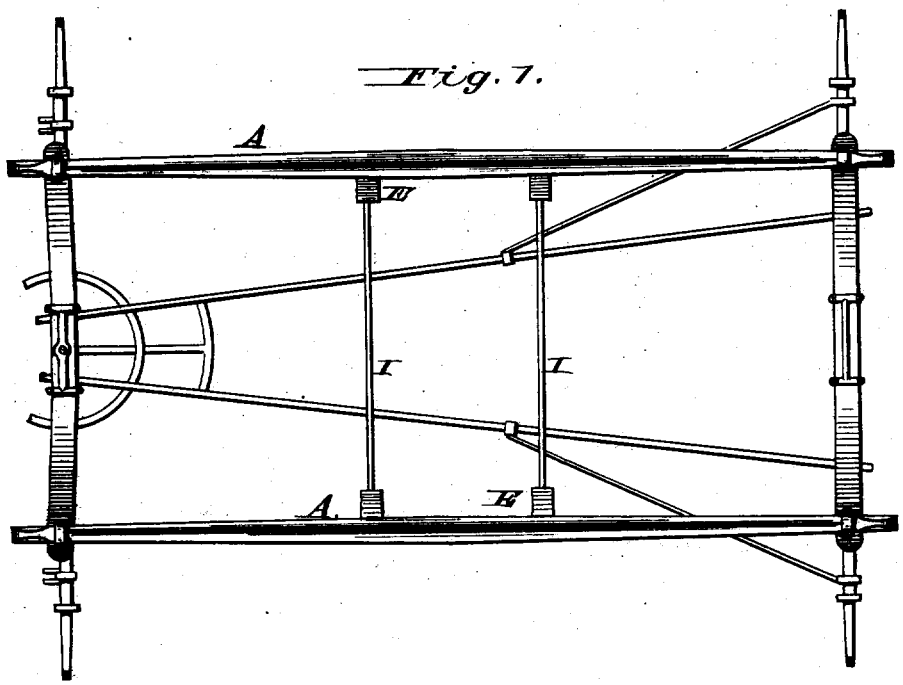
Figure 2:
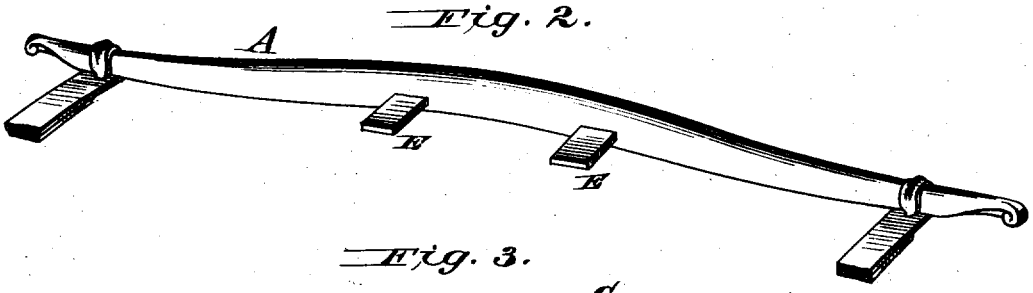
Figure 3:
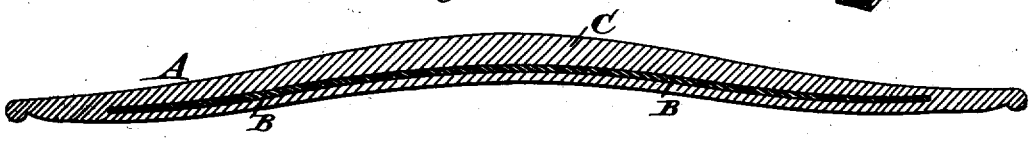
Figure 4:
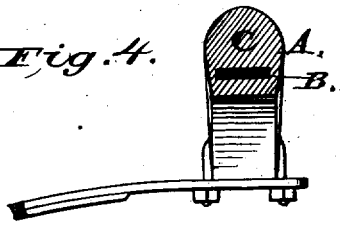

In the accompanying drawings, Figure 1 represents a plan view of the running-gear of a side-bar wagon, representing my improved spring-bar applied thereto. Fig. 2 represents a perspective view of the improved side bar constructed according to my invention. Fig. 3 represents a longitudinal section, and Fig. 4 a transverse section of the same.

The letter A represents the side bar, which is composed of a spring, B, composed of one or more leaves of steel or other metal, inclosed or incased in a covering of elastic non-metallic material, such as vulcanized rubber or other suitable substance, C. Said casing or covering is finished on the outside so as to have the appearance and configuration of the ordinary wooden side bars, and the casing or covering is extended somewhat beyond the ends of the spring in order to cover and protect the same, and furnish a means of attachment to the bolsters or platform of the vehicle. When such casing or covering is composed of india-rubber, the metal is first embedded in or covered with the rubber, and the whole placed in a flask of proper shape and vulcanized, by means of which the parts are united in an integral piece, forming the side bar.

The improved side bar, when applied in position, one set at each side of the vehicle, will support the body and give the desired degree of elasticity without resorting to other springs, which may, however, be used in connection with my invention as with ordinary side bars, if desired.

The metallic spring, by reason of its inclosed position in the casing or covering, and by reason of its not being directly attached to the bolsters, is permitted to assume a horizontal position when depressed, and to return to its original curve with a greater degree of facility than if its ends were secured to fixed parts, as heretofore.

The inclosed spring B may be provided in certain instances with projecting arms or short plates E, which project in an inward direction through the casing or covering, and serve as rests for transverse body-supporting springs, when such are employed, or they may serve as attaching-points for transverse stay-rods I, as in Fig. 1 of the drawings.

I therefore claim—

1. As a new article of manufacture, a side bar for vehicles, consisting of a steel spring incased in a non-metallic bar, substantially as described.

2. The combination, with the metallic spring B, of the continuous non-metallic casing C, surrounding said spring and extending somewhat beyond its sides and ends, as and for the purposes set forth.

3. In combination with the metallic spring and its covering or casing, the plates E, secured to the spring and projecting through the casing, substantially as and for the purpose specified.

In testimony that I claim the foregoing I have hereunto set my hand in the presence of two witnesses.

JOSEPH TILTON.

Witnesses:
DANIEL A. O'CONNELL,
EMANUEL BLUMBERG.